US008400949B2

(12) United States Patent
Callender et al.

(10) Patent No.: US 8,400,949 B2
(45) Date of Patent: Mar. 19, 2013

(54) LIMITED SYSTEM INFORMATION DECODING FOR AUTOMATIC NEIGHBOR RELATIONS IN MOBILE NETWORKS

(75) Inventors: Christopher P. Callender, Fleet (GB); Brian A. Martin, Farnham (GB)

(73) Assignee: Renesas Mobile Corporation, Tokyo (JP)

( * ) Notice: Subject to any disclaimer, the term of this patent is extended or adjusted under 35 U.S.C. 154(b) by 219 days.

(21) Appl. No.: 12/986,430

(22) Filed: Jan. 7, 2011

(65) Prior Publication Data

US 2012/0176918 A1 Jul. 12, 2012

(51) Int. Cl.
*H04B 7/005* (2006.01)
*H04B 1/00* (2006.01)

(52) U.S. Cl. ........ 370/278; 370/292; 370/491; 370/496; 375/145; 455/434; 455/442; 455/444

(58) Field of Classification Search .................. 370/278, 370/292, 312, 328, 338, 491, 496; 375/145, 375/220; 455/434–444, 446, 452.2, 524, 455/525
See application file for complete search history.

(56) References Cited

U.S. PATENT DOCUMENTS

| | | | | |
|---|---|---|---|---|
| 6,968,189 | B1 * | 11/2005 | Mullins et al. ................. | 455/434 |
| 7,369,534 | B2 * | 5/2008 | Amerga et al. ................. | 370/350 |
| 2001/0031638 | A1 | 10/2001 | Korpela et al. ................ | 455/449 |
| 2009/0191862 | A1 | 7/2009 | Amirijoo et al. | |
| 2009/0316595 | A1 | 12/2009 | Kwon et al. .................... | 370/252 |
| 2010/0248717 | A1 * | 9/2010 | Eerolainen ...................... | 455/434 |
| 2011/0038310 | A1 | 2/2011 | Chmiel et al. .................. | 370/328 |
| 2011/0039539 | A1 * | 2/2011 | Maida et al. ................... | 455/422.1 |
| 2011/0195713 | A1 | 8/2011 | Ramasamy et al. ............ | 455/434 |
| 2012/0135731 | A1 * | 5/2012 | Rangaiah et al. .............. | 455/434 |
| 2012/0155576 | A1 * | 6/2012 | Jonsson et al. ................. | 375/340 |
| 2012/0176918 | A1 * | 7/2012 | Callender et al. .............. | 370/252 |

FOREIGN PATENT DOCUMENTS

| | | |
|---|---|---|
| CN | 101262630 A | 9/2008 |
| CN | 101841868 A1 | 9/2010 |
| EP | 0 812 119 A2 | 12/1997 |
| EP | 1 973 356 A2 | 9/2008 |
| EP | 2 056 639 A2 | 5/2009 |

(Continued)

OTHER PUBLICATIONS

"Logged ANR method considerations", Renesas Electronics Europe, 3GPP TSG-RAN WG2 Meeting #72bis, R2-110305, Jan. 2011, 6 pgs.

(Continued)

*Primary Examiner* — Michael Thier
*Assistant Examiner* — Benjamin H Elliott, IV
(74) *Attorney, Agent, or Firm* — Stanton IP Law

(57) ABSTRACT

A UE in the idle or semi-idle state determines that a wirelessly received signal is scrambled by a scrambling code which is not within a locally stored list of scrambling codes received from its serving network node, and applies a rule to determine from the scrambling code whether to decode broadcast system information that is transmitted by an access node using the scrambling code. In one embodiment such a rule is that if the scrambling code is not within the list, do not decode the broadcast system information again if the scrambling code is locally stored from a previous instance of decoding the system information. Another rule embodiment is if the scrambling code is not within the list, do not attempt to decode the system information unless a measured signal strength for the wirelessly received signal is higher than a threshold, which may be absolute or dependent on strength of a signal received from the serving network node.

17 Claims, 3 Drawing Sheets

FOREIGN PATENT DOCUMENTS

| | | | |
|---|---|---|---|
| EP | 2 316 886 A1 | 5/2011 |
| GB | 2469857 A | 11/2010 |
| WO | WO 98/53632 | 11/1998 |
| WO | WO 2005/031985 A2 | 4/2005 |
| WO | WO 2006/118393 A2 | 11/2006 |
| WO | WO 2008/137354 A1 | 11/2008 |

OTHER PUBLICATIONS

3GPP TSG-RAN WG2 Meeting #45, Shin-Yokohama, Japan, (Nov. 15-19, 2004), Change Request, R2-042701, (26 pages).

3GPP TSG RAN WG2#72, "Configuration and Reporting for MDT based ANR," Samsung, Nov. 15-19, 2010 R2-106625.

3GPP TSG-RAN WG2 #72, "Discussion on UMTS ANR non-Cell_DCH Based Approach (log approach)", Huawei, HiSillicon, Nov. 15-19, 2010, R2-106257.

3GPP TSG RAN WG2#72, "Method for ANR Support in UTRAN", Ericsson, Nov. 15-19, 2010, R2-106442.

Nokia, Joint 3GPP TSG RAN WG2 and WG3 on MBMS, Jan. 15-16, 2003, R2-030004, "Basic Principles for RRC State Handling for PMM Connected Mode UE for MBMS Data Reception", (5 pages).

3GPP TSG-RAN WG2 Meeting #69bis, R2-102411, Beijing, China, Apr. 12-16, 2010, Nokia Corporation, Nokia Siemens Networks, "Considerations on Automatic Neighbour Relations for UTRA", (4 pages).

3GPP TSG-RAN WG2 Meeting #60bis, R2-080181, Sevilla, Spain, Jan. 14-18, 2008, Nokia Corporation, Nokia Siemens Networks, "UE Support of SON Automatic Neighbour Relation Function", (2 pages).

3GPP TSG-RAN WG3 Meeting #58, R3-072117, Nov. 5-9, 2007, Jeju Island, Korea, Qualcomm Europe, T-Mobile, "Inter-RAT/frequency Automatic Neighbour Relation Function", (3 pages).

3GPP TSG-RAN WG2 Meeting #70, R2-103148, Montreal, Canada, May 10-14, 2012, Nokia Corporation, Nokia Siemens Networks, "Further Considerations on Automatic Neighbour Relations for UTRA", (2 pages).

* cited by examiner

LIMITED SYSTEM INFORMATION DECODING FOR AUTOMATIC NEIGHBOR RELATIONS IN MOBILE NETWORKS

TECHNICAL FIELD

The exemplary and non-limiting embodiments of this invention relate generally to wireless communication systems, methods, devices and computer programs and, more specifically, relate to how user equipments/mobile terminals might limit the amount of system information they decode, particularly while in an idle or similar low-power state.

BACKGROUND

The following abbreviations that may be found in the specification and/or the drawing figures are defined as follows:
  3GPP third generation partnership project
  ANR automatic neighbor relations
  BSIC base transceiver station identity code
  CPICH common pilot channel
  DCH dedicated (physical) channel
  DL downlink (node B towards UE)
  EUTRAN evolved UTRAN (LTE)
  LTE long term evolution
  NCL neighbor cell list
  Node B base station
  RRC radio resource control
  RSCP received signal code power
  SI system information
  SON self optimizing network
  TDD time division duplex
  UE user equipment
  UL uplink (UE towards node B)
  UTRAN universal terrestrial radio access network For handover and reselection of mobile terminals/UEs from one cell/base station to another some wireless systems have the UE maintain a list of neighbor cells which the UE measures the signal power it receives. Reporting on this RSCP to the serving cell allows the network to more intelligently choose when and to which cell to handover the UE.

But the UE is mobile and so has a limited power supply. The idle mode is intended to conserve the UE's power supply but still the idle mode UE takes measurements of neighbor cells in order to facilitate handovers since the idle UE may still be moving and need handover. In some radio technologies such as UTRAN, for example to facilitate operators to minimize drive tests, the idle UE takes its neighbor cell measurements and stores them temporarily, then reports it's collected and logged measurement data en masse to the network at some predetermined time which is somewhat later than when the earliest logged measurements were taken. This allows the UE to avoid exiting the idle mode simply to report neighbor cell identities and signal strengths.

A problem arises in that the neighbor cell list NCL which the UE uses for this purpose may not be up-to-date for the current geographic location of the UE. The UE receives its NCL from its serving cell but assuming mobility of the idle UE there may be neighbor cells in the UE's locally stored NCL which are no longer viable neighbors, and there may also be viable neighbor cells which are not in the UE's NCL. The latter situation, which may arise for example due to pico/micro cells (e.g., open or closed subscriber group cells) within a neighbor macro cell may be handled in one of two ways. The UE may simply ignore cells which are not in its NCL, but this may lead to improper handovers and reselections to the wrong cell and/or at the wrong time. Alternatively, the UE may detect and take measurements on those cells not in its NCL whose RSCP is sufficiently strong and report them leaving analysis of the most appropriate handover cell candidate to the network which is not power constrained.

The trend in ongoing development of UTRAN systems (e.g., 3GPP TSG-RAN WG2 meeting #72) is to report cells which are not within the NCL, which for brevity is termed logged ANR in 3GPP. See for example document R2-106257 entitled DISCUSSION ON UMTS ANR NON CELL_DCH BASED APPROACH (LOG APPROACH) by Huawei and HiSilicon; document R2-106442 entitled METHOD FOR ANR SUPPORT IN UTRAN by Ericsson and ST Ericsson; and document R2-106625 entitled CONFIGURATION AND REPORTING FOR MDT BASED ANR by Samsung (all at 3GPP TSG-RAN WG2 #72; Jacksonville, USA; 15-19 Nov. 2010). Certain aspects of these proposals extend concepts employed for minimum drive time MDT measurements, by which selected UEs take periodic measurements which are reported to the network at some later UE transmit opportunity and which the network uses for routine network analysis and optimization, distinct from directly managing the reporting UE.

Considering the limited power of mobile terminals, measuring cells not in a UE's NCL raises certain problems. Specifically, if a UE is to report cells other than those in its NCL, it must also identify in its measurement report the cell global identity from which the non-NCL measurements were taken. Most cell global identifiers IDs are readily available from system information SI broadcast by the cell itself, but to get this cell ID the UE would have to decode SI of the non-NCL cells, a task not necessary for mere signal strength measurements.

Over an extended period of idle time this could be performed repeatedly which would result in a non-negligible drain on UE power reserves, reducing the maximum idle/standby time which many users consider as part of their mobile phone purchasing decision. Over a shorter period of time it is reasonable that radio channel conditions might be changing to an extent that some macro neighbor cells are detected which are not in the UE's NCL. Highly dynamic radio channel conditions might also cause the RSCP seen by the same UE for the same cell to move over and under the signal strength threshold for taking a measurement, effectively appearing and disappearing from the UE's measurement 'view'. In this case potentially the UE would have to decode the same SI from the same cell each time the UE's RSCP for that cell went over the threshold and make duplicate log entries, for only after decoding SI for each time RSCP exceeds the threshold will the UE know that the cell has the same global identity as one previously logged.

Various exemplary embodiments detailed below address the above problems to various extents.

SUMMARY

The foregoing and other problems are overcome, and other advantages are realized, by the use of the exemplary embodiments of this invention.

In a first exemplary embodiment of the invention there is a method comprising determining that a wirelessly received signal is scrambled by a scrambling code which is not within a locally stored list of scrambling codes received from a serving network node; and applying a rule to determine from the scrambling code whether to decode broadcast system information that is transmitted by an access node using the scrambling code.

In a second exemplary embodiment of the invention there is an apparatus comprising at least one processor and at least one memory storing a computer program. In this embodiment the at least one memory with the computer program is configured with the at least one processor to cause the apparatus to at least determine that a wirelessly received signal is scrambled by a scrambling code which is not within a locally stored list of scrambling codes received from a serving network node; and to apply a rule to determine from the scrambling code whether to decode broadcast system information that is transmitted by an access node using the scrambling code.

In a third exemplary embodiment of the invention there is a computer readable memory storing a computer program, in which the computer program comprises code for determining that a wirelessly received signal is scrambled by a scrambling code which is not within a locally stored list of scrambling codes received from a serving network node; and code for applying a rule to determine from the scrambling code whether to decode broadcast system information that is transmitted by an access node using the scrambling code.

These and other embodiments and aspects are detailed below with particularity.

DETAILED DESCRIPTION

Figure 1:
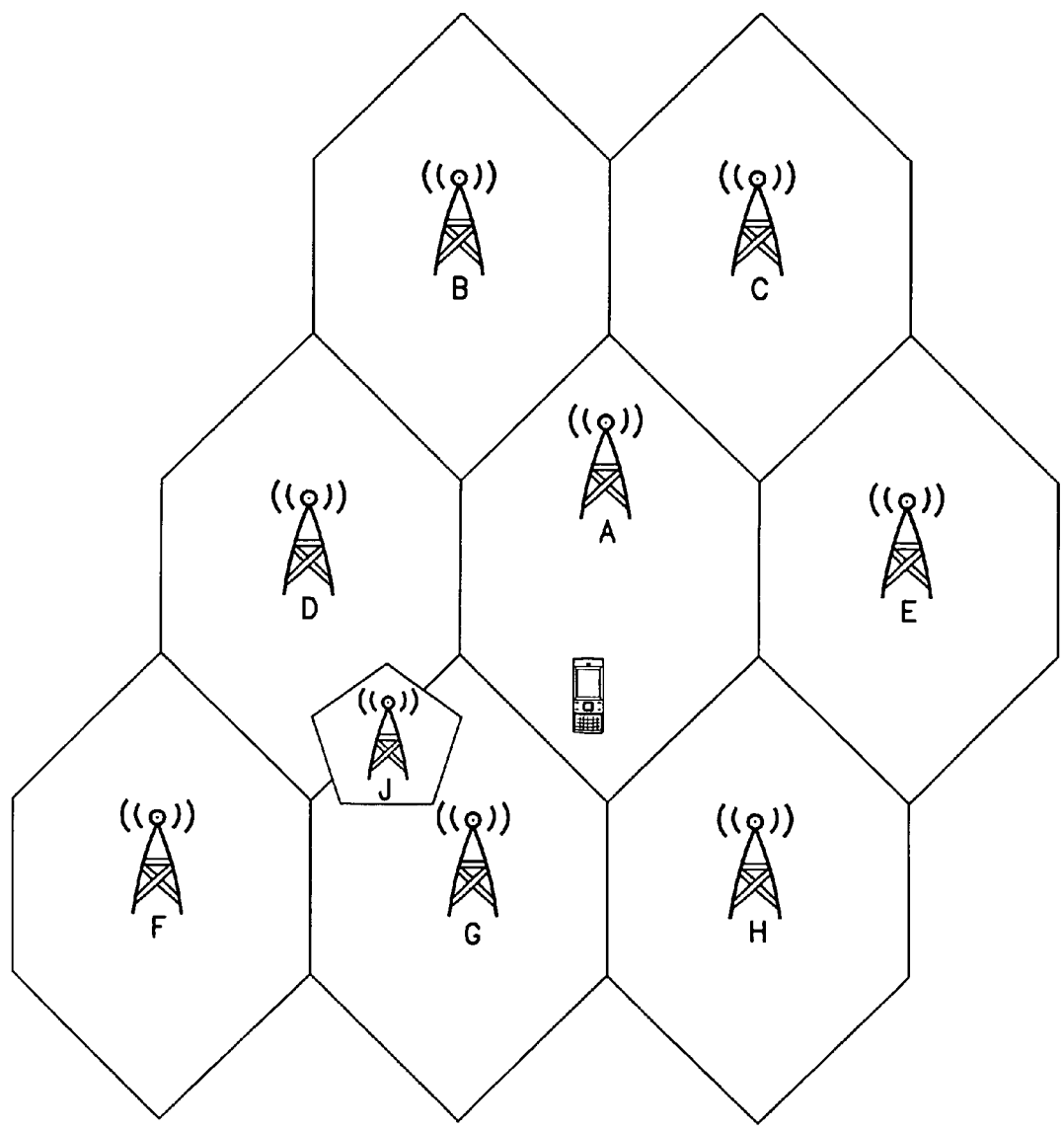
FIG. 1 is a schematic diagram of contiguous macro cells and one pico cell, with a UE moving towards the pico cell while under control of one serving macro cell.

Consider FIG. 1 which illustrates an exemplary environment in which exemplary embodiments of the invention may be practiced to advantage. For brevity the term 'cell' is used interchangeably with the node B which controls the geographic bounds that defines the cell apart from neighbor cells. Cell shapes and borders at FIG. 1 are idealized; in practice cell boundaries are generally not homogeneous and may take irregular shapes due to radio interference from structures or terrain and/or extended radio coverage from relay stations. There is shown a UE 10 which is under control of serving cell A. Assume that UE is moving toward cell G and is currently in an idle operational state and physically located near the border of cells A and G. The serving cell A previously sent to the UE (such as when the UE first handed over to cell A) a NCL which lists cells B, C, D, E, G and H, since each of those cells share a boundary with cell A. The UE has this NCL stored in its local memory and consults it for taking NCL measurements.

At its current location the RSCP at the UE from cell C may be too weak for the UE to take and log measurements for its ANR measurement reports, but this alone is not a problem; the UTRAN will properly infer from the absence of a measurement for cell C in the UE's next measurement report that the UE's RSCP for cell C was below the measurement threshold.

Problems noted in the background section above arise when for example radio conditions are quite good and the UE's RSCP for cell F exceed the measurement logging threshold. Cell F is not in the UE's NCL and so the UE must identify the cell from which this strong RSCP originated. Similar problems arise when there is a micro-cell such as cell J. If cells A through H are considered traditional cellular (macro) cells, cell J may be a closed subscriber group CSG cell (e.g., home node B, university or corporate campus network), or some other micro/pico cell which may be organized on a temporary basis and under control of cell G (e.g., forming a heterogeneous network with cell G). Being CSG or temporary, cell A may not be aware of cell J and so it is not in the NCL which cell A provides to its UEs, but the UE may be a member of the cell J CSG meaning cell J may be a viable handover target.

According to an exemplary embodiment of the invention, the UE utilizes a cell's scrambling code to determine whether to decode that cell's SI for ANR measurement purposes. The UE will have one or more rules to apply for the case it comes across a signal from a cell not within its NCL, and that rule or rules instruct the UE to decode or not decode the SI of the non-NCL cell. At this point the power savings at the UE are realized, regardless of whether or not the measurements taken on the non-NCL cell's signal strength is reported in the UE's ANR measurement report (assuming the scrambling code is such that the rule tells the UE to decode the SI of the non-NCL cell).

That is, advantages of these teachings are still manifest even where the scrambling code and the rule(s) direct the UE to decode the SI but some other decision process has the UE refrain from including the non-NCL cell's measurements from being reported. More typically it is expected in practice that where the UE decodes the SI the measurements for that non-NCL cell will be reported.

The scrambling code as filter for SI decoding relies on the general principle that scrambling codes are typically allocated so as to avoid adjacent cells using the same codes. Prior to decoding SI, the UE can check the scrambling codes of cells in the NCL and also of non-NCL cells that the UE has previously decoded (and stored) to avoid multiple decodings of the SI of an alternately appearing and disappearing cell, a problem detailed above. In this case the UE stores the SI from a previous decoding and need no decode the same SI again. The scrambling code may also be used as a first filter in a decision tree for whether or not to decode SI, so for example if the scrambling code is not in the NCL and has not yet been used by the UE to decode a non-NCL cell's SI, there may be a RSCP or other signal strength threshold, different from that used for the NCL cells, as a next filter for the UE to determine whether or not to decode the SI. By example, if the signal strength threshold for logging NCL cells is x dB, this next filter might be implemented as a signal strength threshold of (x+y) dB for logging the non-NCL measurements for the UL report.

Figure 2:
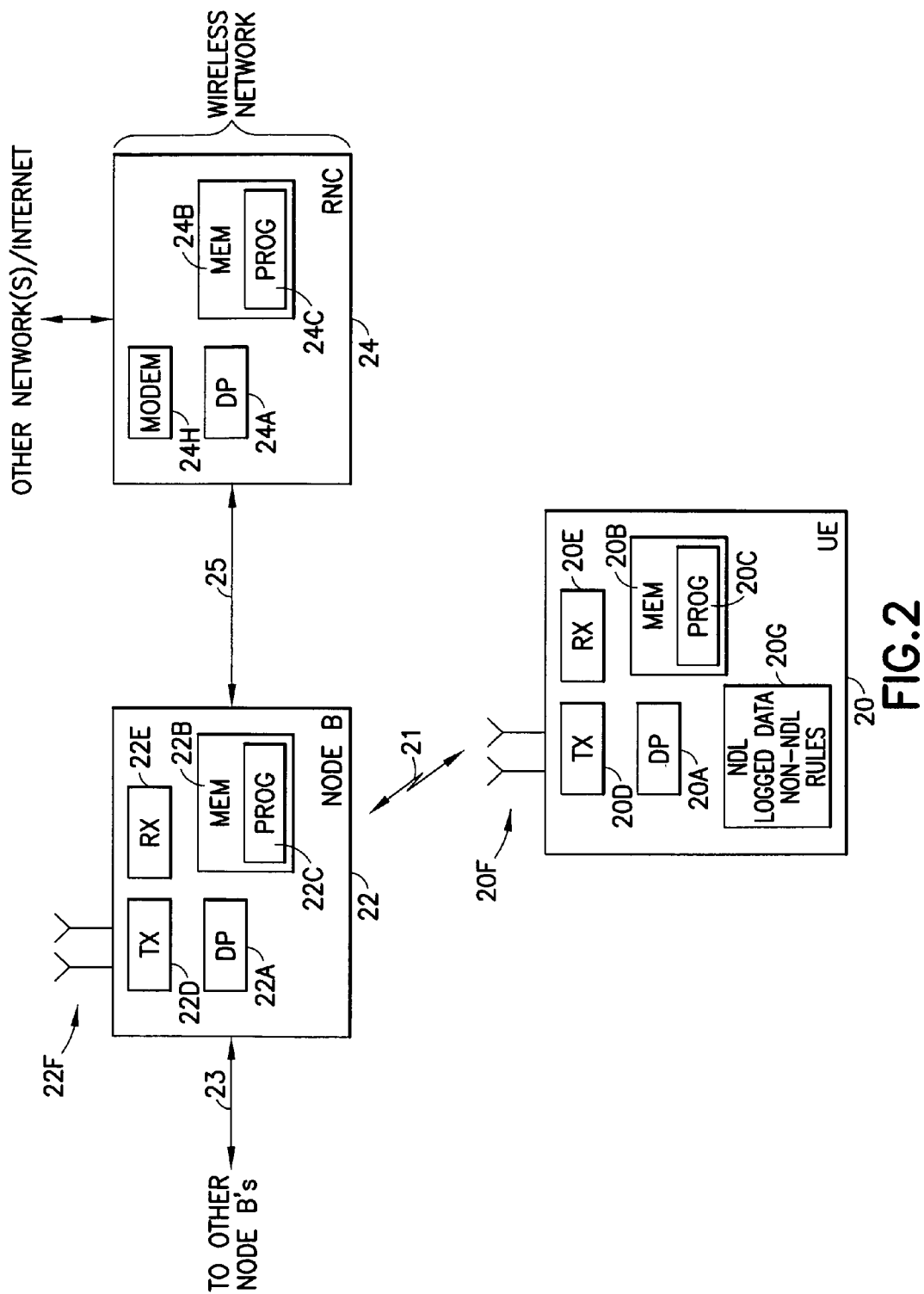
FIG. 2 is a simplified block diagram of the UE and a node B from FIG. 1 and also a higher network node, which are exemplary electronic devices suitable for use in practicing the exemplary embodiments of this invention.

The various embodiments summarized above are detailed further below with respect to FIG. 3. Before detailing those exemplary embodiments, reference is made to FIG. 2 for illustrating a simplified block diagram of various electronic devices and apparatus that are suitable for use in practicing the exemplary embodiments of this invention. In FIG. 2 a wireless network (node B 22 and RNC 24) is adapted for communication over a wireless link 21 with an apparatus, such as a mobile terminal or UE 20, via a network access node, such as a base or relay station or more specifically a node B 22. The network may include a network control element RNC 24, which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the node B 22 via one or more antennas 20F. Also stored in the MEM 20B at reference number 20G is the NCL which the UE 20 received from the node B 22, the logged data which the UE 20 measures and stores until transmitted in an ANR measurement report, and the rule or rules for deciding whether to decode the SI of a non-NDL cell as noted above and further detailed below.

The node B 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. There is a data and/or control path 25 coupling the node B 22 with the RNC 24, and another data and/or control path 23 coupling the node B 22 to other node B's/access nodes.

Similarly, the RNC 24 includes processing means such as at least one data processor (DP) 24A, storing means such as at least one computer-readable memory (MEM) 24B storing at least one computer program (PROG) 24C, and communicating means such as a modem 24H for bidirectional wireless communications with the node B 22 via the data/control path 25. While not particularly illustrated for the UE 20 or node B 22, those devices are also assumed to include as part of their wireless communicating means a modem which may be inbuilt on an RF front end chip within those devices 20, 22 and which also carries the TX 20D/22D and the RX 20E/22E.

At least one of the PROGs 20C in the UE 20 is assumed to include program instructions that, when executed by the associated DP 20A, enable the device to operate in accordance with the exemplary embodiments of this invention, as will be discussed below in greater detail. The node B 22 and RNC 24 may also have software to implement certain aspects of these teachings for processing and analyzing the ANR measurement reports it receives from the UE by knowing what rules the UE is using. In these regards the exemplary embodiments of this invention may be implemented at least in part by computer software stored on the MEM 20B, 22B which is executable by the DP 20A of the UE 20 and/or by the DP 22A of the node B 22, or by hardware, or by a combination of tangibly stored software and hardware (and tangibly stored firmware). Electronic devices implementing these aspects of the invention need not be the entire UE 20 or node B 22, but exemplary embodiments may be implemented by one or more components of same such as the above described tangibly stored software, hardware, firmware and DP, or a system on a chip SOC or an application specific integrated circuit ASIC.

In general, the various embodiments of the UE 20 can include, but are not limited to: cellular telephones; personal portable digital devices having wireless communication capabilities including but not limited to laptop/palmtop/tablet computers, digital cameras and music devices, and Internet appliances.

Various embodiments of the computer readable MEMs 20B and 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A and 22A include but are not limited to general purpose computers, special purpose computers, microprocessors, digital signal processors (DSPs) and multi-core processors.

Now are detailed with reference to FIG. 3 further particular exemplary embodiments from the perspective of the UE 20. Blocks 302, 304 and 306 set the environment for the implementation at blocks 308 and 310 of using scrambling code in deciding whether or not to decode SI.

At block 302 the UE receives from the serving cell/node B a NCL which includes a listing of frequencies and scrambling codes or physical cell identities or BSIC for the neighbor cells in the NCL. By example the node B may send this to the UE 20 upon registration in the cell after a handover from another cell or upon registration after initial access via a random access channel RACH. Note that the neighbor cells may or may not be the same radio access technology as the serving cell; by example the serving cell may be a UTRAN cell and various ones of the neighbor cells may be UTRAN, EUTRAN, GERAN, GSM or some other radio technology. The UE 20 measures all cells for which it is capable, to evaluate the need for reselection.

At block 304 the UE is in an idle or semi-idle operational state. Specifics for the idle and semi-idle states are noted below for the UTRAN system, but other systems might use different names for idle and semi-idle states. Specifically, idle and semi-idle states in UTRAN include idle state as well as the CELL_FACH (forward access channel) state in which the UE continuously monitors the FACH on the DL; the CELL_PCH (paging channel) state in which the UE selects a PCH via an algorithm and uses its discontinuous reception cycle DRX to monitor it via a paging indicator channel PICH; and the URA_PCH state (URA=user registration area) which is similar to the CELL_PCH state except the network is aware of the UE's location to the level of the URA Registration area rather than to the level of the cell as in the CELL_PCH state. All of these states are characterized by the UE performing autonomous reselections when it moves between cells, rather than handover under network control Once the UE 20 has a DCH allocated to it the UE is no longer in an idle or semi-idle operational state.

While in the idle or semi-idle state, at block 306 the UE 20 scans through the list of frequencies in the NCL which is now locally stored in the UE's memory utilizing all possible UTRA scrambling codes. For reasons noted below the serving cell might send a list of scrambling codes which the UE 20 is NOT to check, which is termed herein an exclusionary list. In this case the UE 20 at block 306 scans all the frequencies in the locally stored list utilizing all possible UTRA scrambling codes except scrambling codes within that exclusionary list of scrambling codes received from a serving node.

At block 308 the UE 20 determines that a wirelessly received signal is scrambled by a scrambling code which is not within the locally stored NCL list of scrambling codes which was received from the serving cell/serving network node. At block 310 the UE 20 applies a rule (one or more rules) to determine from the scrambling code whether to decode broadcast system information that is transmitted by an access node using the scrambling code. The term access node, which broadcasts the SI using the scrambling code, is used to distinguish over the serving cell/serving network node which sent the NCL of block 308. By non-limiting example, the access node may be a macro-cell base station, a home node B, or an access node for a CSG or pico/micro cell. Several such exemplary rules are detailed below at blocks 314 and 320.

Block 312 provides further actions which the UE 20 may take for the case that the determination of block 308 is to decode the broadcast system information. In this case the UE 20 decodes the broadcast system information to determine an identity of the network cell which sent the wirelessly received signal, and sends an uplink measurement report which includes an indication of signal strength for the wirelessly received signal and the identity of the access node, or the UE 20 logs the decoded information to its memory for later reporting. Block 312 also provides for the UE to both log in the memory and send in the UL measurement report the signal strength indication and the identity.

Block 314 gives one exemplary rule for block 306, namely the rule is that if the scrambling code is not within the locally stored list received from the serving node, do not decode the broadcast system information again if the scrambling code is locally stored from a previous instance of decoding the system information. Blocks 316 and 318 provide further details for implementing this rule. Specifically, the rule to not decode the broadcast system information again remains valid according to block 316 until there is a change in the serving cell, or at block 318 it remains valid until a fixed period of time elapses (e.g., until 10 minutes elapses from the first time SI for that non-serving cell was decoded). This rule assumes the scrambling codes have been properly planned and allocated in the area, and so it is also applicable for any micro/pico and macro target cell. In case there are unplanned networks (e.g., CSG/femto deployments such as cell J of FIG. 1) a different UE can give a report of a different CSG cell with the same scrambling code. The advantage of the fixed time period of block 318 is that different UEs can share the burden of ANR, and it is not necessary for one UE to provide all the information to the network.

Block 320 gives another exemplary rule for block 306, namely the rule is that if the scrambling code is not within the locally stored list received from the serving node, do not attempt to decode the system information unless a measured signal strength for the wirelessly received signal is higher than a threshold. In this case the threshold may be an absolute threshold or a threshold which depends on strength of a signal received from the serving node.

The absolute threshold may be implemented such that the UE is not to attempt to decode SI if the cell CPICH Ec/Io or RSCP is some fixed measure (x dB) worse than an absolute threshold. When performing ANR this is valuable in order to optimize for connected mode neighbor lists used for handover, since the handover decision is often based on absolute thresholds. If absolute priority-based re-selection is used in the network, this can also be useful for determining neighbor lists for idle-mode operations also.

For the relative signal strength threshold, signal strength may by example be the cell CPICH Ec/Io, and the measured RSCP may be some fixed measure (in dB) worse than that of the serving cell or less than some fixed measure better than that of the serving cell. This is an efficient rule in that there might be no need for a neighbor relationship to be established with a weak cell (deliberate choice of the operator) and also decoding of the SI block has a higher potential of failing or taking an appreciably longer time (hence a greater battery impact) than for more normal-strength neighbor cells. From the network's perspective it is more beneficial that these neighbor cells be decoded and logged by a different UE. Especially when optimizing for idle mode neighbor lists (which are used for cell re-selection/handover), the neighbor relationship is most useful when the cell is better ranked according to reselection rules which may be based on thresholds relative to the serving cell.

In various implementations the threshold(s) noted at block 318 for decoding could be indicated by the UTRAN network as part of the ANR configuration (e.g., at block 302), it may be hard coded in specifications governing the procedure, or it may be left to UE implementation to decide the thresholds.

It is important to note that sometimes detectable cells are deliberately omitted from an NCL by network operators, such as for example if physically neighboring cells are in country/political border areas and belong to a different network operator. In this case, in an exemplary embodiment the serving cell indicates a list or range of scrambling codes which it expects UEs not to log if they are detected. Both absolute thresholds, and thresholds relative to the current serving cell can be considered in the exclusionary log listing.

An exemplary practical embodiment is that the NCL which the UE receives from the serving cell has the scrambling codes and frequencies for those cells in the NCL, and the UE searches for all possible UTRA scrambling codes while it is in the idle mode. This non-NCL scrambling code search may be at a reduced rate compared to the search for cells listed in the NCL. The UE can conduct this reduced rate search on all the frequencies that are included in the NCL. If a cell is detected which is not among those in the NCL list, a decision is made on whether to decode SI blocks based on the scrambling code and the rules of which exemplary ones are detailed with respect to FIG. 3.

One technical effect of these exemplary embodiments is that the UE battery life is extended. The operational cost is that there may in some cases be less information to the network in individual UE logs but the above exemplary rules are targeted to minimize the impact of this; for example the same scrambling code in a short time/same geographical area will likely only give duplicated information. This is also mitigated in that multiple UE can be used for ANR.

Figure 3:
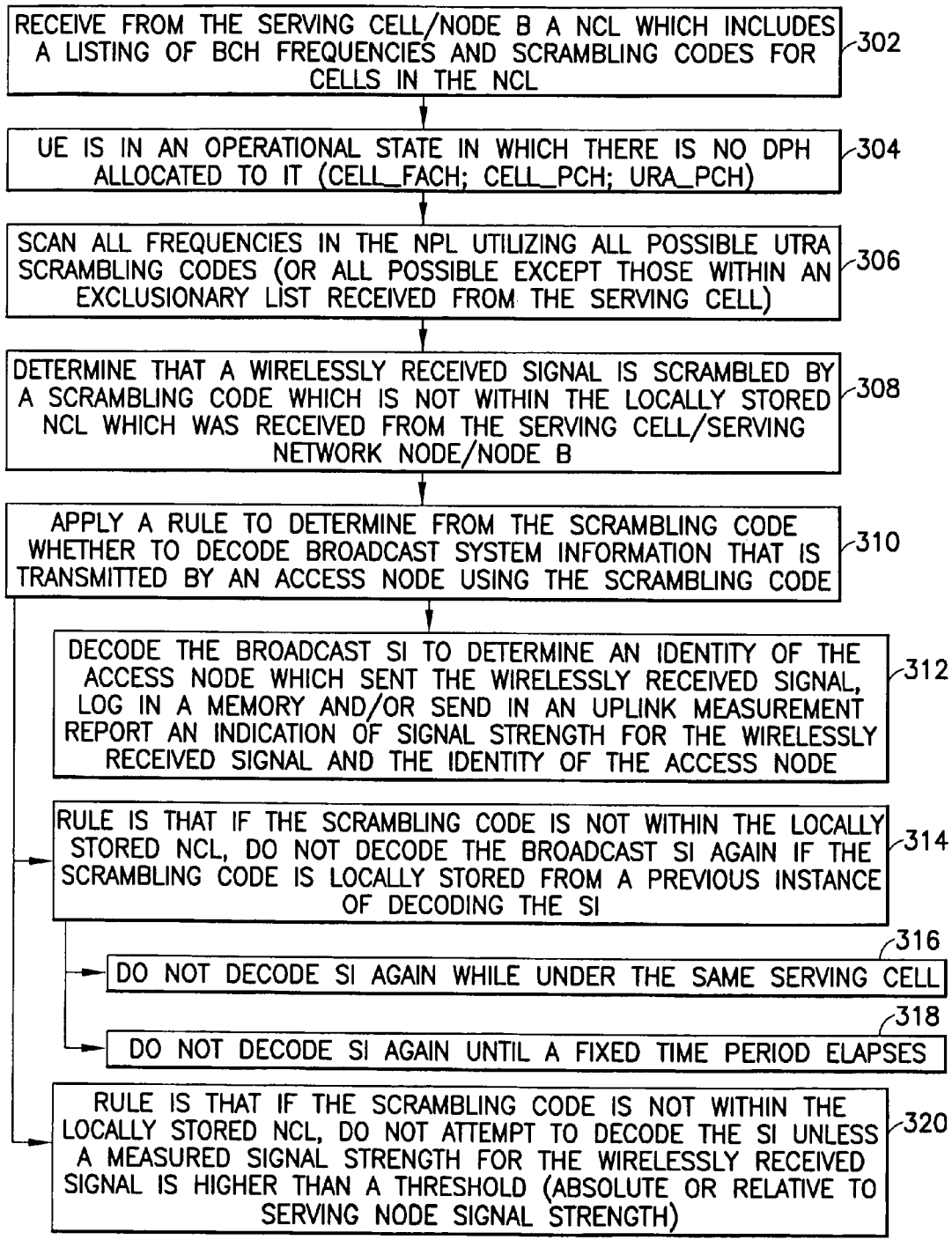
FIG. 3 is a logic flow diagram that illustrates the operation of a method, and a result of execution of computer program instructions embodied on a computer readable memory, in accordance with the exemplary embodiments of this invention.

FIG. 3 is a logic flow diagram which may be considered to illustrate the operation of a method, and a result of execution of a computer program stored in a computer readable memory, and a specific manner in which components of an electronic device are configured to cause that electronic device to operate. The various blocks shown in FIG. 3 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description. While the exemplary embodiments have been described above in the context of the UTRAN system, it should be appreciated that the exemplary embodiments of this invention are not limited for use with only this one particular type of wireless communication system, and that they may be used to advantage in other wireless communication systems such as for example GERAN and GSM and others.

Further, the various names used in the above description (e.g., NCL, names of the various idle states and channels) are not intended to be limiting in any respect, as different radio technologies may use different terms for similar concepts. Specific UTRAN terms are to give a more concrete set of examples for explaining the inventive concepts presented herein. Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method, comprising:
   at a device, determining that a wirelessly received signal is scrambled by a scrambling code which is not within a list of scrambling codes received from a serving network node; and
   at the device, applying a rule to determine from the scrambling code whether to decode broadcast system information that is transmitted by an access node using the scrambling code;
   wherein the rule comprises at least one of:
      if the scrambling code is not within the locally stored list received from the serving network node, do not decode the broadcast system information again if the scrambling code is locally stored from a previous instance of decoding the system information; and,
      if the scrambling code is not within the locally stored list received from the serving network node, do not attempt to decode the system information unless a measured signal strength for the wirelessly received signal is higher than a threshold, in which the threshold is one of:
         absolute; and
         dependent on strength of a signal received from the serving network node.

2. The method according to claim 1, wherein for the case that the determination is to decode the broadcast system information, the method further comprises:
   decoding the broadcast system information to determine an identity of the access node which sent the wirelessly received signal, and at least one of
      storing in a memory an indication of signal strength for the wirelessly received signal and the identity of the access node, and
      sending in an uplink measurement report an indication of signal strength for the wirelessly received signal and the identity of the access node.

3. The method according to claim 1, in which determining that the wirelessly received signal is scrambled by the scrambling code comprises scanning all frequencies in the locally stored list utilizing all possible universal terrestrial radio access (UTRA) scrambling codes.

4. The method according to claim 1, in which determining that the wirelessly received signal is scrambled by the scrambling code comprises scanning all frequencies in the locally stored list utilizing all possible universal terrestrial radio access (UTRA) scrambling codes except scrambling codes within an exclusionary list of scrambling codes received from the serving network node.

5. The method according to claim 1, wherein in the case that the rule comprises:
   if the scrambling code is not within the locally stored list received from the serving network node, do not decode the broadcast system information again if the scrambling code is locally stored from a previous instance of decoding the system information, then the rule to not decode the broadcast system information again remains valid until at least one of:
      a fixed period of time elapses and there is a change in the serving cell.

6. The method according to claim 1, in which the method is executed by a user equipment.

7. An apparatus, comprising:
   at least one processor; and
   at least one memory storing a computer program;
   in which the at least one memory with the computer program is configured with the at least one processor to cause the apparatus to at least:
      determine that a wirelessly received signal is scrambled by a scrambling code which is not within a locally stored list of scrambling codes received from a serving network node; and
   apply a rule to determine from the scrambling code whether to decode broadcast system information that is transmitted by an access node using the scrambling code;
      wherein the rule comprises at least one of:
      if the scrambling code is not within the locally stored list received from the serving network node, do not decode the broadcast system information again if the scrambling code is locally stored from a previous instance of decoding the system information; and, if the scrambling code is not within the locally stored list received from the serving network node, do not attempt to decode the system information unless a measured signal strength for the wirelessly received signal is higher than a threshold, in which the threshold is one of:
         absolute; and
         dependent on strength of a signal received from the serving network node.

8. The apparatus according to claim 7, wherein for the case that the determination is to decode the broadcast system information, the at least one memory with the computer program is configured with the at least one processor to cause the apparatus to at least further:
   decode the broadcast system information to determine an identity of the access node which sent the wirelessly received signal, and at least one of
   store in the at least one memory an indication of signal strength for the wirelessly received signal and the identity of the access node, and
   send in an uplink measurement report an indication of signal strength for the wirelessly received signal and the identity of the access node.

9. The apparatus according to claim 7, in which the at least one memory with the computer program is configured with the at least one processor to cause the apparatus to determine that the wirelessly received signal is scrambled by the scrambling code by causing the apparatus to scan all frequencies in the locally stored list utilizing all possible universal terrestrial radio access (UTRA) scrambling codes.

10. The apparatus according to claim 9, in which the at least one memory with the computer program is configured with the at least one processor to cause the apparatus to determine that the wirelessly received signal is scrambled by the scrambling code by causing the apparatus to scan all frequencies in the locally stored list utilizing all possible universal terrestrial radio access (UTRA) scrambling codes except scrambling codes within an exclusionary list of scrambling codes received from the serving network node.

11. The apparatus according to claim 7, wherein in the case that the rule comprises:
   if the scrambling code is not within the locally stored list received from the serving network node, do not decode the broadcast system information again if the scrambling code is locally stored from a previous instance of decoding the system information, then the rule to not decode the broadcast system information again remains valid until at least one of a fixed period of time elapses and there is a change in the serving cell.

12. The apparatus according to claim 7, in which the apparatus comprises a user equipment.

13. A non-transitory computer readable memory storing a computer program comprising:
   code for determining that a wirelessly received signal is scrambled by a scrambling code which is not within a locally stored list of scrambling codes received from a serving network node; and
   code for applying a rule to determine from the scrambling code whether to decode broadcast system information that is transmitted by an access node using the scrambling code;
   wherein the rule comprises at least one of:
if the scrambling code is not within the locally stored list received from the serving network node, do not decode the broadcast system information again if the scrambling code is locally stored from a previous instance of decoding the system information; and, if the scrambling code is not within the locally stored list received from the serving network node, do not attempt to decode the system information unless a measured signal strength for the wirelessly received signal is higher than a threshold, in which the threshold is one of:
   absolute; and
   dependent on strength of a signal received from the serving network node.

14. The non-transitory computer readable memory according to claim 13, wherein for the case that the determination is to decode the broadcast system information, the computer program further comprises:
   code for decoding the broadcast system information to determine an identity of the access node which sent the wirelessly received signal, and
   code for at least one of
   storing in the computer readable memory an indication of signal strength for the wirelessly received signal and the identity of the access node, and
   sending in an uplink measurement report an indication of signal strength for the wirelessly received signal and the identity of the access node.

15. The non-transitory computer readable memory according to claim 13, in which determining that the wirelessly received signal is scrambled by the scrambling code comprises scanning all frequencies in the locally stored list utilizing all possible universal terrestrial radio access (UTRA) scrambling codes.

16. The non-transitory computer readable memory according to claim 13, in which determining that the wirelessly received signal is scrambled by the scrambling code comprises scanning all frequencies in the locally stored list utilizing all possible universal terrestrial radio access (UTRA) scrambling codes except scrambling codes within an exclusionary list of scrambling codes received from the serving network node.

17. The non-transitory computer readable memory according to claim 13, wherein in the case that the rule comprises if the scrambling code is not within the locally stored list received from the serving network node, do not decode the broadcast system information again if the scrambling code is locally stored from a previous instance of decoding the system information, then the rule to not decode the broadcast system information again remains valid until at least one of: a fixed period of time elapses and there is a change in the serving cell.

* * * * *

UNITED STATES PATENT AND TRADEMARK OFFICE
CERTIFICATE OF CORRECTION

PATENT NO.        : 8,400,949 B2                                               Page 1 of 1
APPLICATION NO.   : 12/986430
DATED             : March 19, 2013
INVENTOR(S)       : Christopher P. Callender and Brian A. Martin It is certified that error appears in the above-identified patent and that said Letters Patent is hereby corrected as shown below:

In the Claims:

Claim 10 at col. 10, line 55; "claim 9" should read --claim 7--

Signed and Sealed this
Fourth Day of June, 2013

Teresa Stanek Rea
*Acting Director of the United States Patent and Trademark Office*